United States Patent
Nakano et al.

(10) Patent No.: US 6,708,899 B2
(45) Date of Patent: Mar. 23, 2004

(54) HEADLAMP CLEANER AND INJECTION CONTROL METHOD

(75) Inventors: Hiroyuki Nakano, Kosai (JP); Tsuneo Fukushima, Kariya (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/207,896

(22) Filed: Jul. 31, 2002

(65) Prior Publication Data

US 2003/0029932 A1 Feb. 13, 2003

(30) Foreign Application Priority Data

Aug. 9, 2001 (JP) ........................................ 2001-242944

(51) Int. Cl.[7] .................................................. B05B 1/10
(52) U.S. Cl. ................................................... 239/284.2
(58) Field of Search ........................................ 239/284.2

(56) References Cited

U.S. PATENT DOCUMENTS 4,390,128 A * 6/1983 Fujikawa et al. ......... 239/284.2
6,234,410 B1 * 5/2001 Martin et al. ............ 239/284.2

FOREIGN PATENT DOCUMENTS

JP          U-4-95859          8/1992

* cited by examiner

*Primary Examiner*—Brian L. Casler
*Assistant Examiner*—Lina R Kontos
(74) *Attorney, Agent, or Firm*—Posz & Bethards, PLC

(57) ABSTRACT

A pump apparatus has an electric motor having an impeller fixed to a rotating axis thereof driven based on signals from an injection control unit to rotate in a normal direction and, then, switched to rotate in a reverse direction so that, when the motor is rotated in the normal direction, the washer liquid is sucked from a second intake conduit and discharged via a first discharge port from a first injection nozzle and, when the motor is rotated in the reverse direction, the washer liquid is sucked from a first intake conduit and discharged via a second discharge port from a second injection nozzle. Since the washer liquid is not injected at the same time from the first and second injection nozzles, an injection amount per unit time of the washer liquid is relatively small, which makes the pump apparatus more compact.

14 Claims, 8 Drawing Sheets

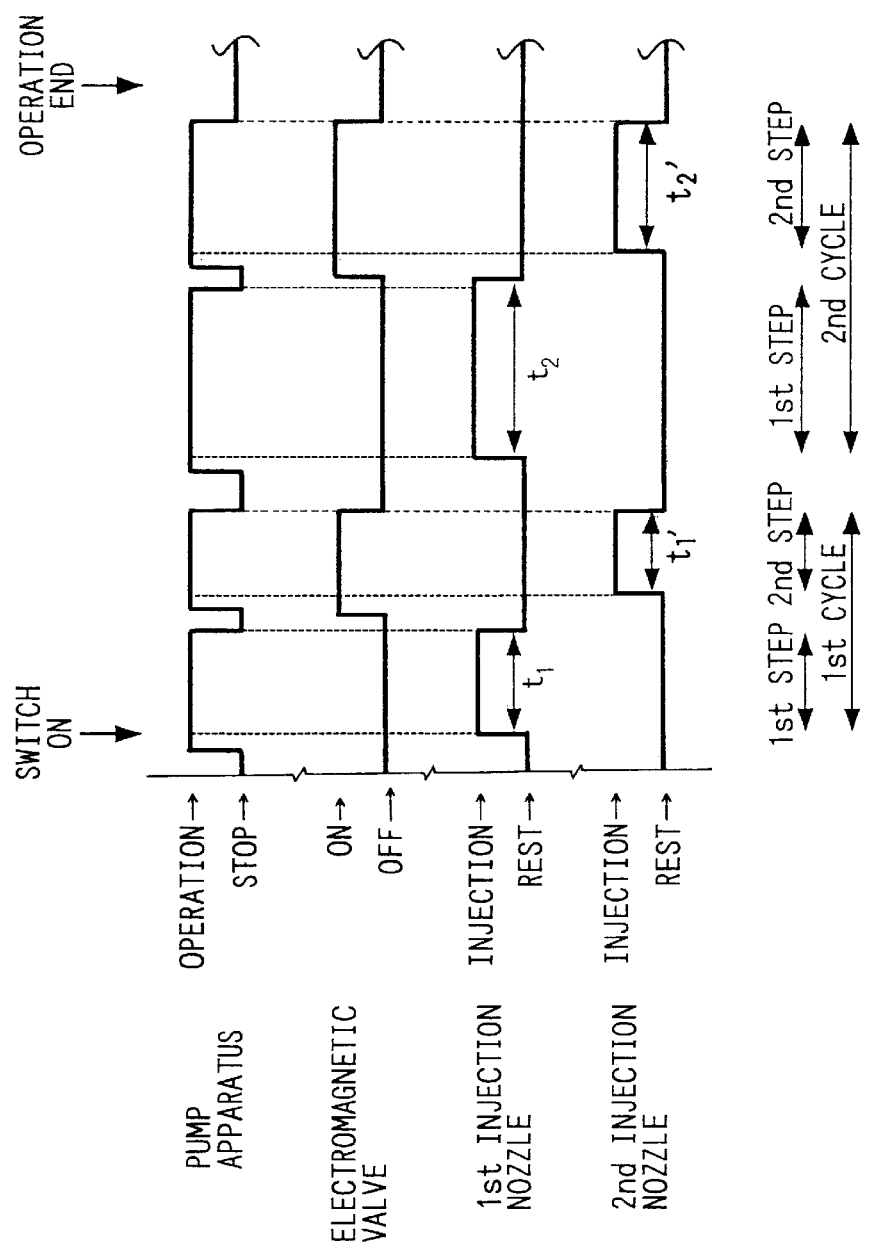

HEADLAMP CLEANER AND INJECTION CONTROL METHOD

CROSS REFERENCE TO RELATED APPLICATION

This application is based upon and claims the benefit of priority of Japanese Patent Application No. 2001-242944 filed on Aug. 9, 2001, the content of which is incorporated herein by reference.

BACKGROUND OF THE INVENTION

1. Field of the Invention

The present invention relates to a headlamp cleaner for injecting washer liquid in order to clean vehicle headlamps and an injection control method applicable to the headlamp cleaner.

2. Description of Related Art

A headlamp cleaner is known as a device for cleaning vehicle headlamps at a driver's choice, when the headlamps are dirty, upon actuating a switch provided near a driver's seat. The headlamp cleaner is composed of a pair of injection nozzles which are arranged to face positions where the headlamps are provided on the left and right sides of the vehicle and from which washer liquid is injected toward the headlamps, a tank disposed in an engine room for storing washer liquid and a pump apparatus housed in the tank for delivering washer liquid under pressure through piping hoses to the respective injection nozzles.

When the driver actuates the switch at hand and the pump apparatus is operated, the washer liquid is supplied under pressure to the injection nozzles from the pump apparatus so that the washer liquid is sprayed simultaneously to both of the headlamps corresponding to the respective injection nozzles. Since the headlamps are cleaned only by injecting the pressurized washer liquid and a wiper device is not necessary for their cleaning, the structure of the headlamp cleaner is relatively simple.

However, in the conventional headlamp cleaner, the pump apparatus has to deliver the washer liquid whose discharge pressure and discharge amount are relatively high because not only the headlamps are cleaned only by washer liquid injection but also the washer liquid is injected at the same time from the pair of right-hand and left-hand injection nozzles. Accordingly, the conventional headlamp cleaner requires the pump apparatus whose body is relatively large and which is provided for a purpose of its own exclusive use.

The larger body pump apparatus as mentioned above causes a difficulty on installing the headlamp cleaner in the engine room where many component parts are arranged (due to limitation of its installation space) and, further, is not always commonly applicable to a variety of models so that a cost of the headlamp cleaner is higher.

SUMMARY OF THE INVENTION

An object of the present invention is to provide a headlamp cleaner having a compact pump apparatus for supplying washer liquid to first and second injection nozzles arranged to face toward positions where headlamps are provided on left and right sides of a vehicle.

Another object is to provide a method of controlling a washer liquid injection from the headlamp cleaner.

To achieve the above objects, in a headlamp cleaner for injecting washer liquid to headlamps of a vehicle provided respectively on a driver seat side and on a passenger front seat side, one of first and second injection nozzles is positioned near and injects the washer liquid to one of the headlamps and the other thereof is positioned near and injects the washer liquid to the other of the headlamps. A pump apparatus, which has an input port communicating with a tank in which the washer liquid is stored and first and second discharge ports communicating with the first and second injection nozzles, respectively, is provided with not only a pump for delivering under pressure the washer liquid sucked from the tank through the intake port to the first and second discharge ports but also injection nozzle change over means operative based on signals from an injection control unit to cause a first selective flow of the washer liquid from the pump only to one of the first and second injection nozzles through one of the first and second discharge ports and, then, switch the first selective flow to a second selective flow of the washer liquid from the pump only to the other of the first and second injection nozzles through the other of the first and second discharge ports.

With the headlamp cleaner mentioned above, since the washer liquid is supplied to the selected one of the first and second injection nozzles due to the injection nozzle change over means, the first and second injection nozzles do not inject the washer liquid at the same time to the headlamps so that an amount per unit time of the washer liquid discharged from the pump is relatively small, resulting in making the pump apparatus more compact.

It is preferable that the signals generated by the injection control unit govern the pump apparatus to execute, as an injection cycle, a first step of injecting the washer liquid only from the first injection nozzle for a first preset time period and, then, a second step of injecting the washer liquid only from the second injection nozzle for a second preset time period. More preferably, the injection cycle is executed at least a twice. In this case, each of the first and second preset time periods in the former injection cycle may be shorter than that in the latter injection cycle.

The washer liquid primarily injected to one of the headlamps at the first step of the first cycle gives moisture to the one of the headlamps so that the washer liquid injected to the one of the headlamps at the first step of the second cycle effectively cleans dirt, since the dirt is apt to come off the surface of the one of the headlamps and rise in the washer liquid during a time period when the washer liquid is injected to the other of the headlamps at the second step of the first cycle. In particular, the injection time period (the first and second preset time periods) of the first cycle for giving moisture to the respective headlamps to cause the dirt to rise in the washer liquid is shorter than the injection time period of the second cycle so that cleaning (injection) time is shorter and consumption of the washer liquid is smaller as a whole, resulting in achieving higher cleaning efficiency.

It is preferable that the first injection nozzle is positioned near the headlamp on the driver seat side and the second injection nozzle is positioned near the headlamp on the passenger front seat side. In this case, preferably, the first preset time period is longer than the second preset time period. If the headlamp on the driver seat side is cleaned first with priority over or more intensively than the headlamp on the passenger front seat side, an intensity of illumination of the headlamp on the driver seat side is recovered earlier or easily than that of the headlamp on the passenger front seat side, which gives an advantage that driver's visibility is secured at an earlier time.

As one of the embodiment, the pump apparatus mentioned above may have the pump (preferably, an electric motor having an impeller fixed to a rotating axis thereof) driven based on the signals from the injection control unit to rotate in a normal direction and, then, switched to rotate in a reverse direction, the intake port having first and second intake ports, and first and second valves. In this case, when the pump is rotated in the normal direction, pressure of the washer liquid sucked from the second intake port and pressurized by the pump causes the first valve to move so as to close the first intake port and open the first discharge port in a state that the second valve closes the second discharge port, and, when the pump is rotated in the reverse direction, pressure of the washer liquid sucked from the first intake port and pressurized by the pump causes the second valve to move so as to close the second intake port and open the second discharge port in a state that the first valve closes the first discharge port. Accordingly, the first and second valves in cooperation with the pump constitute the injection nozzle change over means.

As another embodiment, the pump apparatus may have, as the injection nozzle change over means, an electromagnetic valve operative based on the signals from the injection control unit to cause a first state that the first discharge port is opened and the second discharge port is closed and, then, switch the first state to a second state that the first discharge port is closed and the second discharge port is opened.

Further, as a modification, the injection nozzle change over means may be first and second electromagnetic valves operative independently of each other based on the signals from the injection control unit to cause a first state that the first discharge port is opened by the first electromagnetic valve and the second discharge port is closed by the second magnetic valve and, then, switch the first state to a second state that the first discharge port is closed by the first magnetic valve and the second discharge port is opened by the second magnetic valve. It is preferable that the first and second electromagnetic valves are positioned in vicinity of and upstream of the first and second injection nozzles.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 10 is a timing chart showing an operation of the headlamp cleaner according to a modification of the second embodiment.

DETAILED DESCRIPTION OF THE PREFERRED EMBODIMENTS

A headlamp cleaner 10 according to a first embodiment of the present invention is described with reference to FIGS. 1 to 4.

Figure 1:
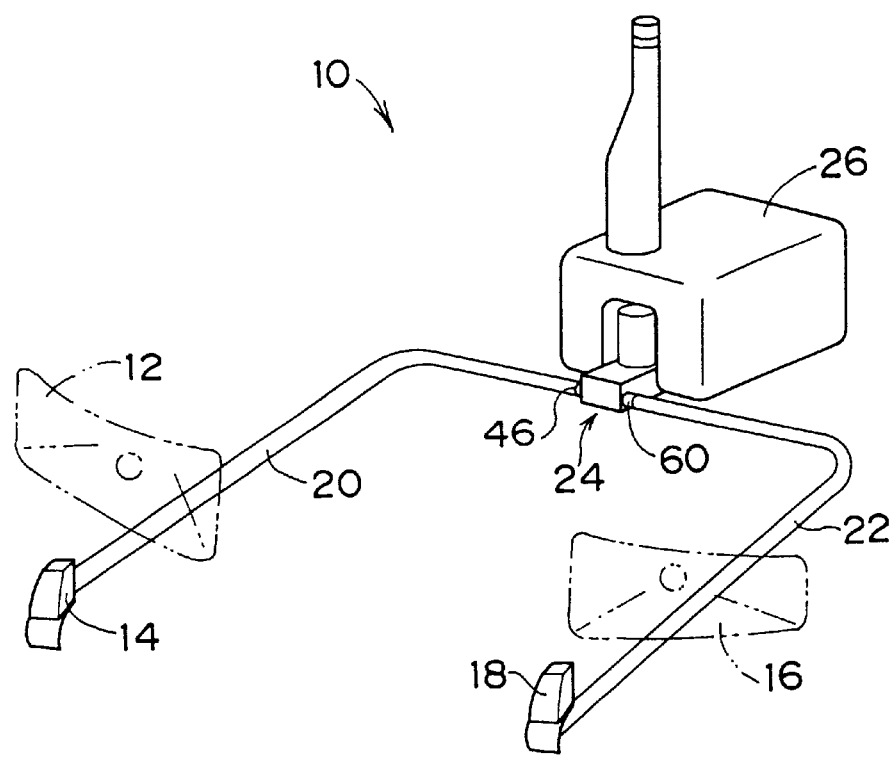
FIG. 1 is a perspective view showing an outline of a structure of a headlamp cleaner according to a first embodiment.

FIG. 1 shows a perspective schematic entire view showing an outline of the headlamp cleaner 10. The headlamp cleaner 10 has a first injection nozzle 14 arranged to face a right-hand headlamp 12 of a vehicle and a second injection nozzle 18 arranged to face a left-hand headlamp 16 thereof.

Each of the first and second injection nozzle 14 and 18, from which washer liquid supplied thereto can be injected, is connected to a pump apparatus 24 via each of piping hoses 20 and 22 through which washer liquid pressurized by the pump apparatus 24 is delivered. The pump apparatus 24 is accommodated in a tank 26 installed in an engine room of the vehicle for storing washer liquid.

Figure 2A:
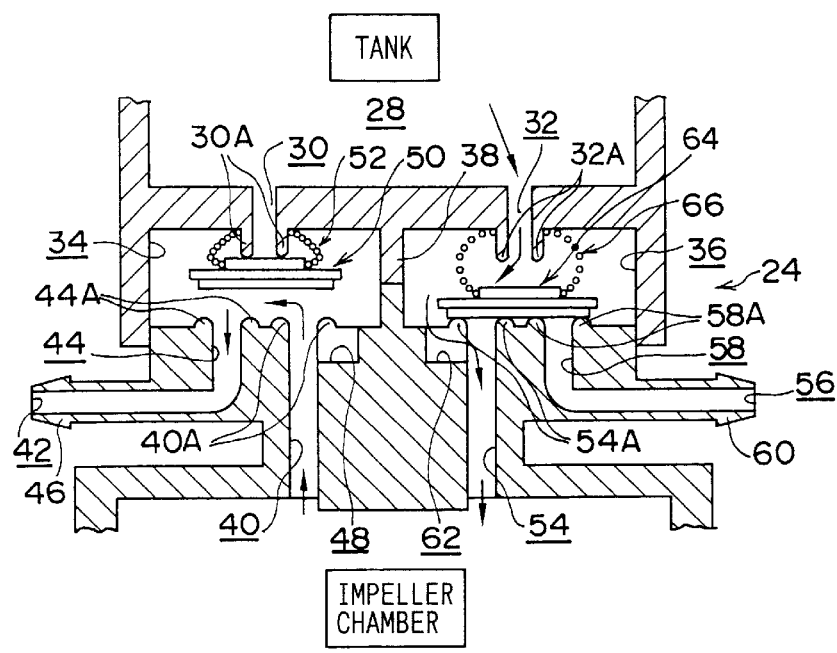
FIG. 2A is a sectional view of injection nozzle change over means of a pump apparatus of FIG. 1.

As shown in FIG. 2A, the pump apparatus 24 has an intake port 28 positioned near a bottom of the tank 26. The pump apparatus 24 is further provided below the intake port 28 (on a side of an impeller room 68 to be described later) with first and second communication conduits 30 and 32, and first and second valve chambers 34 and 36 communicated with the intake port 28 via the first and second communication conduits 30 and 32, respectively. The first and second valve chambers 34 and 36 are partitioned with a partition wall 38.

Below the first valve chamber 34 provided are a communication conduit 40 communicating with the impeller chamber 68 and a discharge communication conduit 44 communicating with a first discharge port 42. A pipe wall around the first discharge port 42 constitutes a hose joint 46 to which the piping hose 20 for connection with the first injection nozzle 14 is connected.

A valve seats 30A, 40A and 44A are provided at positions protruding into the first valve chamber 34 around openings of the communication and discharge communication conduits 30, 40 and 44 on a side of the first valve chamber 34, respectively. A notch 48 for bypassing washer liquid is also provided near the opening of the communication conduit 40 on a side of the first valve chamber 34.

A first valve 50 is disposed in the first valve chamber 34 and movable up and down between a position where the communication conduit 30 is closed (communication between the intake port 28 and the first valve chamber 34 is interrupted) upon contacting the valve seat 30A and a position where the discharge communication conduit 44 is closed upon contacting the valve seats 40A and 44A.

A coil spring 52 for urging the first valve 50 downward is disposed between the first valve 50 and an inner wall of the first valve chamber 34. Accordingly, the first valve 50 is, normally, in contact with the valve seats 40A and 44A due to biasing force of the coil spring 52. FIG. 2 shows a state that the first valve 50 has been moved upward against the biasing force of the coil spring 52. In this state, communication between the first valve chamber 34 and the communication conduit 40 (that is, the impeller chamber 68) is maintained due to the notch 48.

Below the second valve chamber 36 are provided a communication conduit 54 communicating with the impeller chamber 68 independently of the communication conduit 40 and a discharge communication conduit 58 communicating with a second discharge port 56. A pipe wall around the second discharge port 56 constitutes a hose joint 60 to which the piping hose 22 for connection with the second injection nozzle 18 is connected.

A valve seats 32A, 54A and 58A are provided at positions protruding into the second valve chamber 36 around openings of the communication and discharge communication conduits 32, 54 and 58 on a side of the second valve chamber 36, respectively. A notch 62 for bypassing washer liquid is also provided near the opening of the communication conduit 54 on a side of the second valve chamber 36.

A second valve 64 is disposed in the second valve chamber 36 and movable up and down between a position where the communication conduit 32 is closed (communication between the intake port 28 and the second valve chamber 36 is interrupted) upon contacting the valve seat 30A and a position where the discharge communication conduit 58 is closed upon contacting the valve seats 54A and 58A.

A coil spring 66 for urging the second valve 64 downward is disposed between the second valve 64 and an inner wall of the second valve chamber 36. Accordingly, the second valve 64 is, normally, in contact with the valve seats 54A and 58A due to biasing force of the coil spring 66. In this state, communication between the second valve chamber 36 and the communication conduit 54 (that is, the impeller chamber 68) is maintained due to the notch 62.

Figure 2B:
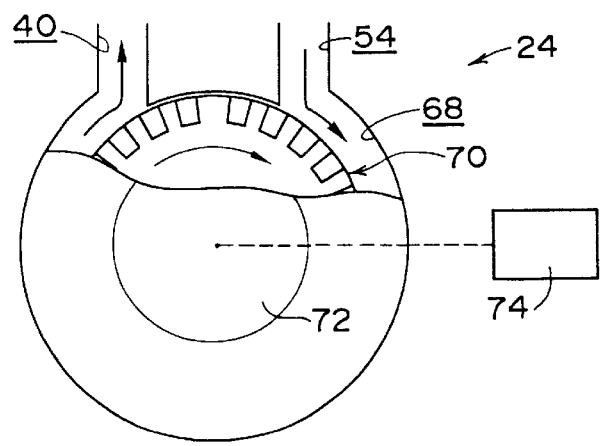
FIG. 2B is a plan view including partly broken-out section of an impeller chamber of a pump of the pump apparatus of FIG. 1.

As shown in FIG. 2B, the pump apparatus 24 is provided with the impeller chamber 68 which is formed in substantially annular shape in a plan view. The communication conduits 40 and 54 communicate with the impeller chamber 68 independently of each other, as mentioned above.

An impeller 70 is arranged coaxially and rotatably in the impeller chamber 68. The impeller 70 is fixed to a rotation axis (not shown) of an electric motor 72 which is rotatable both in a normal direction (rotate clockwise in FIG. 2B) and in a reverse direction. The electric motor 72 drives the impeller 70 to rotate in normal and reverse directions. The rotation of the impeller 70 in any of the normal and reverse directions causes to increase pressure of washer liquid (deliver under pressure).

The impeller 70 rotating in the normal direction is operative to suck the washer liquid from the communication conduit 54, increase its pressure and deliver it under pressure to the communication conduit 40. On the other hand, the impeller 70 rotating in the reverse direction is operative to suck the washer liquid from the communication conduit 40, increase its pressure and deliver it under pressure to the communication conduit 54.

When the impeller 70 rotates in the normal direction, flow pressure of the washer liquid delivered to the first valve chamber 34 via the communication conduit 40 causes the first valve 50 to move upward against the biasing force of the coil spring 52 and come in contact with the valve seat 30A so that the intake port 28 communicates with the first discharge port 42 via the communication conduit 32, the second valve chamber 36, the notch 62, the communication conduit 54, the impeller chamber 68, the communication conduit 40, the first valve chamber 34 and the discharge communication conduit 44 (refer to arrows shown in FIG. 2A), while the communication between the intake port 28 and the second discharge port 56 is interrupted.

When the impeller 70 rotates in the reverse direction, flow pressure of the washer liquid delivered to the second valve chamber 36 via the communication conduit 54 causes the second valve 64 to move upward against the biasing force of the coil spring 66 and come in contact with the valve seat 32A so that the intake port 28 communicates with the second discharge port 56 via the communication conduit 30, the first valve chamber 34, the notch 48, the communication conduit 40, the impeller chamber 68, the communication conduit 54, the second valve chamber 36 and the discharge communication conduit 58, while the communication between the intake port 28 and the first discharge port 42 is interrupted.

As mentioned above, the first and second valves 50 and 64 of the pump apparatus 24 are operative to change over a port for discharging the washer liquid to a selected one of the first and second discharge ports 42 and 56 according to the rotating directions of the impeller 70. In this sense, the first and second valves 50 and 64 play a role as injection nozzle change over means in cooperation with the electric motor 72 with the impeller 70 which is operative as a pump.

A controller 74 as an injection control unit is connected in circuit with the electric motor 72. An output of the controller 74 causes the electric motor 72 to stop, rotate in the normal direction or rotate in the reverse direction. A switch (not shown), which is positioned near and operated by a driver, is connected in circuit with the controller 74. When the switch is turned on by the driver, the controller 74 controls the operation of the electric motor 72 (pump apparatus 24) to inject the washer liquid based on a predetermined injection pattern. Detail of the predetermined injection pattern is described later.

An operation of the first embodiment is described below.

In the headlamp cleaner 10 according to the first embodiment, the electric motor 72 is operated based on the injection pattern whose program is preset in the controller 74 when the driver turns on the switch near the driver's seat.

Figure 3:
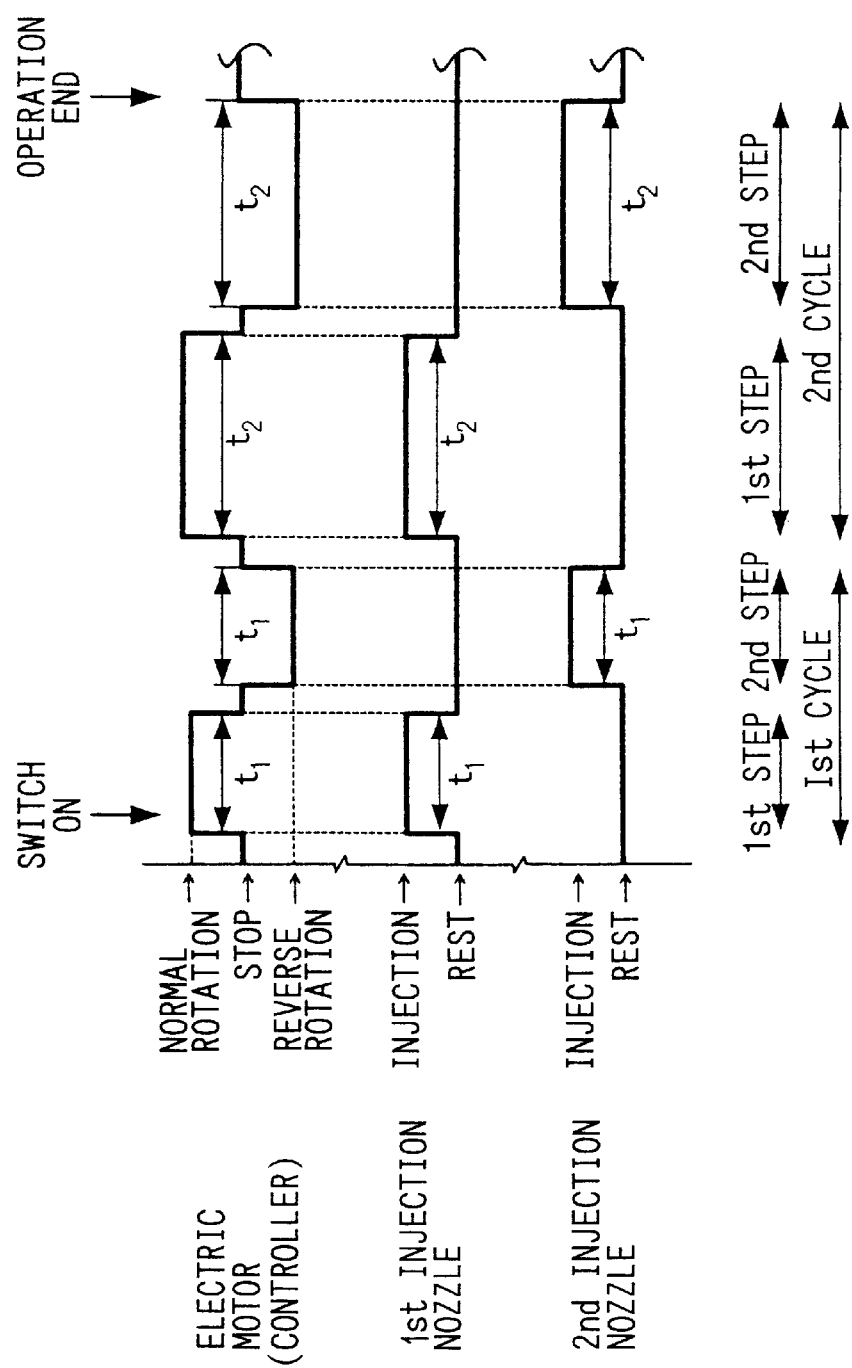
FIG. 3 is a timing chart showing an operation of the headlamp cleaner according to the first embodiment.

As shown in a timing chart of FIG. 3, the electric motor 72 is rotated in the normal direction for a first preset time period t1 at a first step of a first cycle and, then, in the reverse direction for a second preset time period t1 at a second step thereof. Subsequently, the electric motor 72 is rotated in the normal direction for a first preset time period t2 at a first step of a second cycle and, then, in the reverse direction for a second preset time period t2 at a second step thereof.

As mentioned above, the first and second preset time periods in the first or second cycle are same, t1 or t2 so that the time periods during which the washer liquid are injected to the left-hand and right-hand headlamps 12 and 16, respectively, are same. The time period t1 is shorter than the time period t2 (for example, t1=1.5 sec. and t2=2.5 sec.). Time period from a starting point when the driver turns on the switch to a finishing point when the second cycle has been completed (cleanings of the left-hand and right-hand headlamps 12 and 16 have been completed) is set to a value not larger than 10 seconds.

Figure 4A:
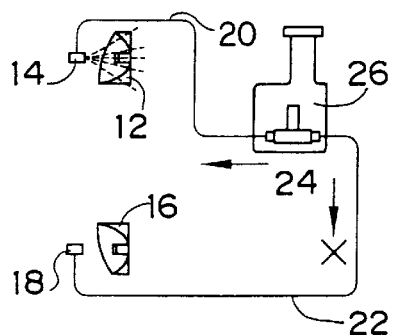
FIG. 4A is a schematic chart showing washer liquid flow at a first step of a first cycle in the headlamp cleaner according to the first embodiment.

At the first step of the first cycle, the impeller 70 rotates in the normal direction in response to the normal direction rotation of the electric motor 72, so the washer liquid flowed into the impeller 68 from the tank 26 through the intake port 28 is pressurized by the impeller 70 and discharged (delivered under pressure) from the first discharge port 42. As shown in FIG. 4A, the pressurized washer liquid is supplied to the first injection nozzle 14 through the piping hose 20 and the first injection nozzle 14 injects the pressurized washer liquid toward the right-hand headlamp 12 for the time period t1.

At this time, the washer liquid is not supplied to the second injection nozzle 14 since the second valve 64 closes the discharge communication conduit 58 so that the second injection nozzle 14 does not inject the washer liquid to the left-hand headlamp 16.

Figure 4B:
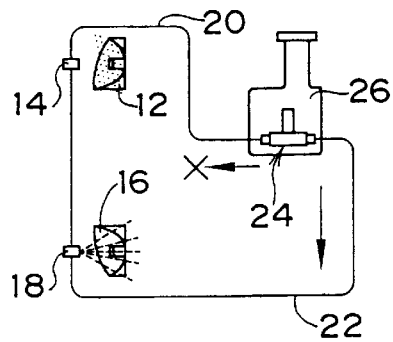
FIG. 4B is a schematic chart showing washer liquid flow at a second step of the first cycle in the headlamp cleaner according to the first embodiment.

At the second step of the first cycle, the impeller 70 rotates in the reverse direction in response to the reverse direction rotation of the electric motor 72, so the washer liquid flowed into the impeller 68 from the tank 26 through the intake port 28 is pressurized by the impeller 70 and discharged (delivered under pressure) from the second discharge port 56. As shown in FIG. 4B, the pressurized washer liquid is supplied to the second injection nozzle 18 through the piping hose 22 and the second injection nozzle 18 injects the pressurized washer liquid toward the left-hand headlamp 12 for the time period t1.

At this time, the washer liquid is not supplied to the first injection nozzle since the first valve 50 closes the discharge communication conduit 40 so that the first injection nozzle 18 does not inject the washer liquid to the right-hand headlamp 16. On the other hand, the washer liquid primarily injected to the right-hand headlamp 12 at the first step gives moisture to the right-hand headlamp 12 during this injection rest time so that dirt on the surface of the right-hand headlamp 12 is apt to come off the right-hand headlamp 12 and rise in the washer liquid.

Figure 4C:
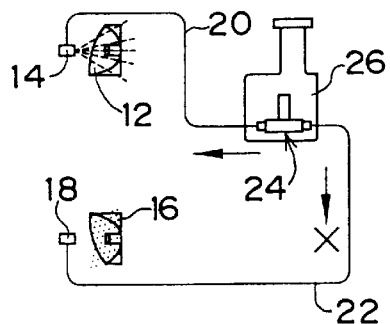
FIG. 4C is a schematic chart showing washer liquid flow at a first step of a second cycle in the headlamp cleaner according to the first embodiment.

As shown in FIG. 4C, at the first step of the second cycle, the first injection nozzle 14 injects the washer liquid toward the right-hand headlamp 12 for the time period t2, similarly as the first step of the first cycle. The washer liquid injection for the time period t2 serves to remove the dirt caused to rise by the washer liquid injected in the first cycle from the right-hand headlamp 12 so that the cleaning of the right-hand headlamp 12 completes.

At this time, the washer liquid is not injected to the left-hand headlamp 16, which is similar to the first step of the first cycle. On the other hand, the washer liquid primarily injected to the left-hand headlamp 16 at the second step of the first cycle gives moisture to the left-hand headlamp 16 during this injection rest time so that dirt on the surface of the left-hand headlamp 16 is apt to come off the left-hand headlamp 16 and rise in the washer liquid.

Figure 4D:
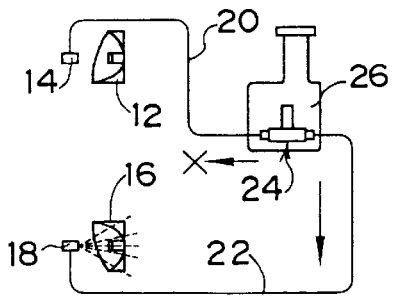
FIG. 4D is a schematic chart showing washer liquid flow at a second step of the second cycle in the headlamp cleaner according to the first embodiment.

As shown in FIG. 4D, at the second step of the second cycle, the second injection nozzle 18 injects the washer liquid toward the left-hand headlamp 16 for the time period t2, similarly as the second step of the first cycle. The washer liquid injection for the time period t2 serves to remove the dirt caused to rise by the washer liquid injected in the first cycle from the left-hand headlamp 16 so that the cleaning of the left-hand headlamp 16 completes.

As mentioned above, the right-hand and left-hand headlamps 12 and 16, which are arranged on the right and left sides of the vehicle, respectively, are effectively cleaned.

The pump apparatus 24 has the injection nozzle change over means that is operative to supply the washer liquid to the selected one of the first and second injection nozzles 14 and 18 based on a change between the normal and reverse direction rotation of the electric motor 72 according to the injection pattern (control method) preset in the controller 74. That is, the first and second injection nozzles 14 and 18 do not inject the washer liquid at the same time but inject only to the right-hand headlamp 12 at the first step and, then, only to the left headlamp at the subsequent second step so that an amount per unit time of the washer liquid to be discharged from the pump apparatus 24 is limited, resulting in making the pump apparatus 24 compact.

According to the headlamp cleaner 10 of the first embodiment and the control method applied thereto, the headlamp cleaner 10 can be manufactured at lower cost and installed without difficulty in the engine room whose installation space is limited since the pump apparatus 24 is compact as mentioned above.

Further, since the washer liquid is supplied selectively to the one of the first and second injection nozzles 14 and 18, it is not required that a pressure loss due to the piping hose 20 connecting the pump apparatus 24 and the first injection nozzle 14 and a pressure loss due to the piping hose 22 connecting the pump apparatus 24 and the second injection nozzle 18 are set identical, that is, it is not necessary to install the piping hoses in consideration of pressure balance therebetween as in the conventional headlamp cleaner. Therefore, the headlamp cleaner 10 can be easily mounted or assembled to the vehicle.

Moreover, the dirt of the headlamps 12 and 16 can be easily removed, so the headlamps 12 and 16 can be effectively cleaned, since the controller 74 instructs to execute the first and second cycles and the dirt on each of the headlamps 12 and 16 rises in the washer liquid due to the washer liquid injection based on the first cycle and, then, is blown off by the washer liquid injection based on the second cycle.

In particular, the injection time period t1 (the first and second preset time periods) of the first cycle for giving moisture to the respective headlamps 12 and 16 to cause the dirt to rise in the washer liquid is shorter than the injection time period t2 of the second cycle so that cleaning (injection) time is shorter and consumption of the washer liquid is smaller as a whole. As a result, not only cleaning efficiency is higher but also capacity of the tank 26 is smaller so that the headlamp cleaner 10 is more compact and more easily installed in the vehicle.

Furthermore, as the pump apparatus 24 has the injection valve change over means whose function is to change the injection port through which the washer liquid is discharged selectively to one of the first and second discharge ports 42 and 56 according to the rotating directions of the impeller 70, which are governed by changing the rotating directions of the electric motor 72, it is not required to interpose movable connecting portions between the pump apparatus 24 and the respective injection nozzles 14 and 18. Accordingly, the installation of the headlamp cleaner 10 to the vehicle is further easier and a piece number of component parts of the headlamp cleaner 10 is smaller.

For easily understanding the operation of the headlamp cleaner, it is described in the first embodiment that the rotation time period of the electric motor 72 in the normal or reverse direction is same to the washer liquid injection time period of the first or second injection nozzle t1 or t2. However, actually, the rotation time period of the electric motor 72 in the normal or reverse direction is set slightly longer than the washer liquid injection time period of the first or second injection nozzle t1 or t2 in consideration of a delivering time during which the washer liquid is delivered through the piping hoses 20 and 22, that is, the time required before the piping hoses 20 and 22 are filled with the washer liquid.

To reduce a time lag due to the delivering time during which the washer liquid is delivered through the piping hoses 20 and 22 (time difference between the time when the driver turns on the switch and the time when the washer liquid injection actually starts), it is preferable to provide check valves each immediately adjacent to each of the injection nozzles 14 and 18 to maintain, when the headlamp cleaner 10 is not actuated, a state that the piping hoses 20 and 22 are filed with the washer liquid. The check valves serve to prevent the washer liquid from leaking from the respective injection nozzles 14 and 18 when the headlamp cleaner 10 is not actuated.

A headlamp cleaner 80 according to a second embodiment of the present invention is described with reference to FIGS. 5 to 8.

Figure 5:
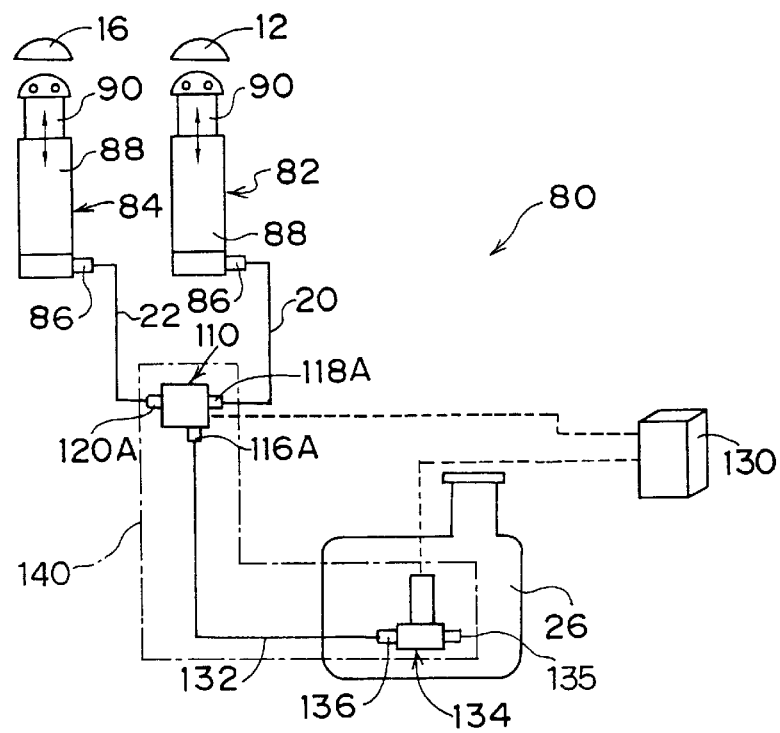
FIG. 5 is a perspective view showing an outline of a structure of a headlamp cleaner according to a second embodiment.

FIG. 5 shows a schematic entire view showing an outline of the headlamp cleaner 80. The headlamp cleaner 80 has a first injection nozzle 82 arranged to face the right-hand headlamp 12 of the vehicle and a second injection nozzle 84 arranged to face the left-hand headlamp 16 thereof.

Figure 6:
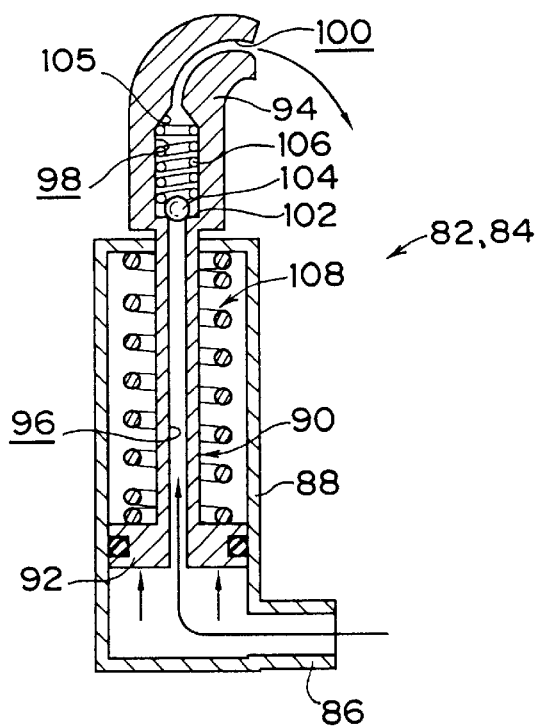
FIG. 6 is a schematic sectional view of a first or second injection nozzle of the headlamp cleaner according to the second embodiment.

The first and second injection nozzles 82 and 84 are expansion and contraction type injection nozzles, which are different from the first and second injection nozzles 14 and 18 in the first embodiment. As shown in FIG. 6, each of the first and second injection nozzles 82 and 84 is composed of an extensible nozzle 90 and a cylinder 88 with a hose joint 86 to which the piping hose 20 or 22 is connected.

The extensible nozzle 90 is provided at an end thereof with a piston 92 housed in the cylinder 88 so that the piston 92 is movable in an axial direction of the cylinder 88. The extensible nozzle 90 is provided at another end thereof with an injection portion 94 that protrudes outward water-tightly from the cylinder 88. The extensible nozzle 90 is further provided inside thereof with a washer liquid conduit 96 opened to a side of the piston 92, a valve chamber 98 whose end communicates with a terminal end of the washer liquid conduit 96, and an injection bore 100 communicating with another end of the valve chamber 98.

A boundary between the valve chamber 98 and the washer liquid conduit 96 is stepped and provided on a side of the valve chamber 98 with a valve seat 102. A spherical valve 104 is arranged axially movably in the valve chamber 98 so that, when the spherical valve 104 comes in contact with the valve seat 102, communication between the valve chamber 98 and the washer liquid conduit 96 is interrupted. A coil spring 106, whose one end is in contact with the spherical valve 104 and whose another end is retained by a conical portion 105 provided in the valve chamber 98 on an opposite side to the valve seat 102, urges the spherical valve 104 toward the valve seat 102 so that the communication between the valve chamber 98 and the washer liquid conduit 96 is interrupted.

A coil spring 108 is arranged between the piston 92 and an inner end face of the cylinder 88 on a side of the extensible nozzle 90 protruding outward and urges the extensible nozzle 90 in such a direction that the extensible nozzle 90 is contracted with respect to the cylinder 88.

When the washer liquid is supplied to an inside of the cylinder 88 through the hose joint 86, liquid pressure of the washer liquid causes the extensible nozzle 90 to expand with respect to the cylinder 88 against the biasing force of the coil spring 108. When the liquid pressure in the cylinder 88 further increases, the liquid pressure of the washer liquid causes the spherical valve 104 to move away from the valve seat 102 against the biasing force of the coil spring 106. Accordingly, the extensible nozzle 90, which is normally located at a position within a bumper of the vehicle and the like, moves to a position near each of the headlamps 12 and 16 where the washer liquid can be easily sprayed from the injection bore 100 to the each of the headlamps 12 and 16.

The first and second injection nozzles 82 and 84 are connected via the piping hoses 20 and 22 to an electromagnetic valve 110 serving as injection nozzle change over means.

Figure 7:
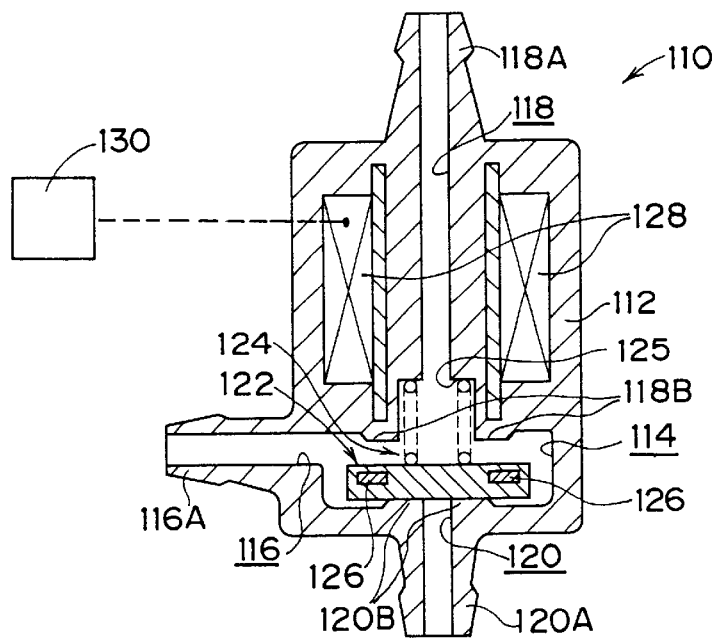
FIG. 7 is a schematic sectional view of an electric valve of the headlamp cleaner according to the second embodiment.

As shown in FIG. 7, the electromagnetic valve 110 has a valve body 112. The valve body 112 is provided with a valve chamber 114 that communicates with a flow-in conduit 116 through which the washer liquid is supplied thereto, and first and second flow-out conduits 118 and 120 through which the washer liquid is discharged. The flow-in conduit 116 and the first and second flow-out conduits 118 and 120 communicate with hose joints 116A, 118A and 120A, which protrude out of the valve body 112, respectively. The hose joints 118A and 120A constitute first and second discharge ports. The first and second flow-out conduits 118 and 120 extend in opposite directions on a straight line from the valve chamber 114. Each of the first and second flow-out conduits 118 and 120 is provided at an opening end thereof on a side of the valve chamber 114 with a valve seat 118B or 120B. The valve seats 118B and 120B are opposed to each other and protrude into the valve chamber 114, respectively.

A valve 122 is arranged in the valve chamber 114. The valve 122 is movable between a position where the valve 122 is in contact with the valve seat 118B so that the communication between the flow-in conduit 116 and the flow-out conduit 118 is interrupted and the communication between the flow-in conduit 116 and the flow-out conduit 120 is permitted and a position where the valve 122 is in contact with the valve seat 120B so that the communication between the flow-in conduit 116 and the flow-out conduit 120 is interrupted and the communication between the flow-in conduit 116 and the flow-out conduit 118 is permitted.

A coil spring 124, whose one end is in contact with the valve 122 and whose the other end is in contact with a spring seat 125 formed around an end of the flow-out conduit 118, urges the valve 122 toward the valve seat 120B in a normal state.

An electromagnetic member 126 is embedded in the valve 122. An electromagnetic coil 128 is embedded in the valve body 112 around the flow-out conduit 118. The electromagnetic coil 128 is connected in circuit with a controller 130 as an injection control unit and, when current is supplied from the controller 130 thereto, generates electromagnetic force of attracting the valve 122, in which the electromagnetic member 126 is embedded, toward the valve seat 118B.

As mentioned above, the electromagnetic valve 110 causes the flow-in conduit 116 to communicate selectively with one of the flow-out conduits 118 and 120 according to application and non-application (on/off) of current from the controller 130.

The hose joint 118A of the electromagnetic valve 110 (first discharge port) is connected to the piping hose 20 connecting with the first injection nozzle 82 and the hose joint 120A (second discharge port) is connected to the piping hose 22 connecting with the second injection nozzle 84. An end of a piping hose 132 is connected to the hose joint 116A and another end thereof is connected to a single piece discharge port 136 of a pump 134.

The pump 134, whose intake port 135 communicates with the tank 26, is operative to deliver under pressure the washer liquid of the tank 26 from the discharge port 136. The pump 134 has the single piece discharge port 136 and discharges the washer liquid only therefrom, that is, an impeller (not shown) of the pump 134 rotates only in one direction, which is different from the impeller 70 of the pump apparatus 24 of the first embodiment.

The pump 134 is connected in circuit with the controller 130. A switch (not shown), which is positioned near and operated by the driver, is connected in circuit with the controller 130. When the switch is turned on by the driver, the controller 130 controls the operation of the pump 134 and the electromagnetic valve 110 to inject the washer liquid based on an injection pattern preset in the controller 130. Detail of the preset injection pattern is described later. The pump 134 and the electromagnetic valve 110 of the second embodiment constitute a pump apparatus 140.

An operation of the second embodiment is described below.

In the headlamp cleaner 80 according to the second embodiment, the pump 134 and the electromagnetic valve 110 are operated based on the injection pattern whose program is preset in the controller 130 when the driver turns on the switch near the driver's seat.

Figure 8:
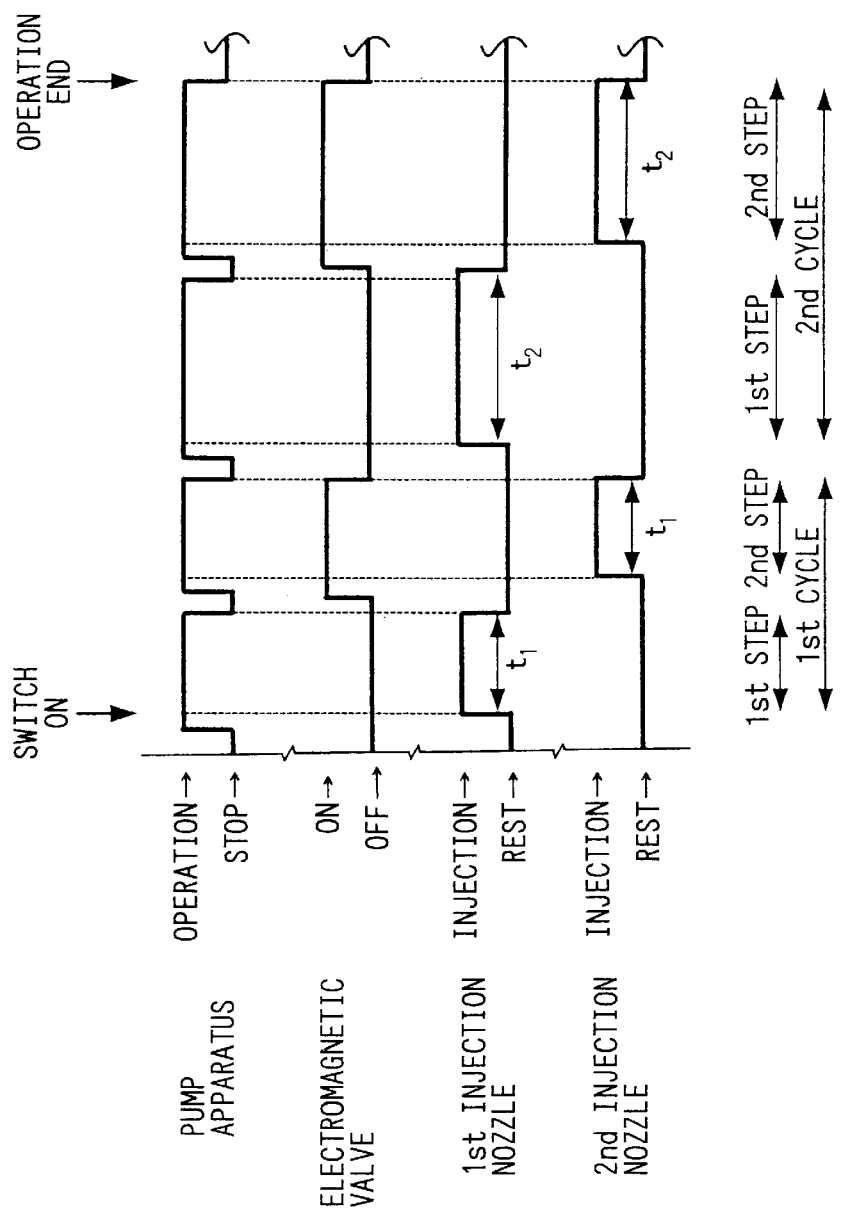
FIG. 8 is a timing chart showing an operation of the headlamp cleaner according to the second embodiment.

As shown in a timing chart of FIG. 8, the controller 130 supplies current to the pump 134 but does not supply current to the electromagnetic coil 128 at a first step of a first cycle. Accordingly, the pump 134 is operated and the communication between the flow-in conduit 116 and the first flow-out conduit 118 is maintained in the electromagnetic valve 110. An operation time period of the pump 134 is slightly longer than the first preset time period t1 in consideration of the time necessary for the extensible nozzle 90 of the first injection nozzle 82 to expand.

Subsequently (after the operation of the pump 134 stops), the controller 130 supplies current to the electromagnetic coil 128 at a second step of a first cycle so that the communication between the flow-in conduit 116 and the first flow-out conduit 118 is switched to the communication between the flow-in conduit 116 and the second flow-out conduit 120. The controller 130 further supplies current to the pump 134 at the same timing as the electromagnetic valve 110 has changed its communication to the communication between the flow-in conduit 116 and the second flow-out conduit 120 at the second step of the first cycle. That is, the pump 134 is operated again after the current is applied to the electromagnetic coil 128 in consideration of a time necessary for movement of the valve 122. Operation time period of the pump 134 is slightly longer than the second preset time period t1 in consideration of the time necessary for the extensible nozzle 90 of the second injection nozzle 84 to expand. At the same time as the operation of the pump 134 stops, the current supply to the electromagnetic valve 110 stops.

Then, the controller 130 supplies current to the pump 134 but does not supply current to the electromagnetic coil 128 at a first step of a second cycle. Accordingly, the pump 134 is operated and the communication between the flow-in conduit 116 and the second flow-out conduit 120 is maintained in the electromagnetic valve 110. An operation time period of the pump 134 is slightly longer than the first preset time period t2 in consideration of the time necessary for the extensible nozzle 90 of the first injection nozzle 82 to expand.

Subsequently (after the operation of the pump 134 stops), the controller 130 supplies current to the electromagnetic coil 128 at a second step of the second cycle so that the communication between the flow-in conduit 116 and the second flow-out conduit 120 is switched to the communication between the flow-in conduit 116 and the first flow-out conduit 118. The controller 130 further supplies current to the pump 134 at the same timing as the electromagnetic valve 110 has changed its communication to the communication between the flow-in conduit 116 and the first flow-out conduit 118 at the second step of the second cycle. That is, the pump 134 is operated again after the current is applied to the electromagnetic coil 128 in consideration of a time necessary for movement of the valve 122. Operation time period of the pump 134 is slightly longer than the second preset time period t2 in consideration of the time necessary for the extensible nozzle 90 of the second injection nozzle 84 to expand. At the same time as the operation of the pump 134 stops, the current supply to the electromagnetic valve 110 stops.

As mentioned above, the first and second preset time periods in the first or second cycle are same, t1 or t2 so that the time periods during which the washer liquid are injected to the left-hand and right-hand headlamps 12 and 16, respectively, are same. The time period t1 is shorter than the time period t2 (for example, t1=1.5 sec. and t2=2.5 sec.). Time period from a starting point when the driver turns on the switch to a finishing point when the second cycle has been completed is set to a value not larger than 10 seconds.

At the first step of the first cycle, the washer liquid pressurized by the pump apparatus 134 is supplied via the flow-in conduit 116 of the electromagnetic valve 110 and the first flow-out conduit 118 to the first injection nozzle 82. The extensible nozzle 90 of the first injection nozzle 82 expands with respect to the cylinder 88 by the liquid pressure of the washer liquid applied thereto so that the injection bore 100 moves to a position where the washer liquid can be easily injected to the right-hand headlamp 12. When the liquid pressure of the washer liquid further increases in a state that the extensible nozzle 90 has moved to a maximum extent, the washer liquid is sprayed toward the right-hand headlamp 12 for the first preset time period t1.

At this time, the washer liquid is not supplied to the second injection nozzle 84 since the valve 122 closes the second flow-out conduit 120 so that the washer liquid is not sprayed to the left-hand headlamp 16.

At the second step of the first cycle, the washer liquid pressurized by the pump 134 is supplied via the flow-in conduit 116 of the electromagnetic valve 110 and the second flow-out conduit 120 to the second injection nozzle 84. The extensible nozzle 90 of the second injection nozzle 84 expands with respect to the cylinder 88 by the liquid pressure of the washer liquid applied thereto so that the injection bore 100 moves to a position where the washer liquid can be easily injected to the left-hand headlamp 16. When the liquid pressure of the washer liquid further increases in a state that the extensible nozzle 90 has moved to a maximum extent, the washer liquid is sprayed toward the left-hand headlamp 16 for the first preset time period t1.

At this time, the washer liquid is not supplied to the first injection nozzle 82 since the valve 122 closes the first flow-out conduit 118 so that the washer liquid is not sprayed to the right-hand headlamp 16. On the other hand, the washer liquid primarily injected to the right-hand headlamp 12 at the first step gives moisture to the right-hand headlamp 12 during this injection rest time so that dirt on the surface of the right-hand headlamp 12 is apt to come off the right-hand headlamp 12 and rise in the washer liquid.

At the first step of the second cycle, the first injection nozzle 84 injects the washer liquid toward the right-hand headlamp 12 for the first preset time period t2, similarly as the first step of the first cycle. The washer liquid injection for the time period t2 serves to remove the dirt caused to rise by the washer liquid injected in the first cycle from the right-hand headlamp 12 so that the cleaning of the right-hand headlamp 12 completes.

At this time, the washer liquid is not injected to the left-hand headlamp 16, which is similar to the first step of the first cycle. On the other hand, the washer liquid primarily injected to the left-hand headlamp 16 at the second step of the first cycle gives moisture to the left-hand headlamp 16 during this injection rest time so that dirt on the surface of the left headlamp 16 is apt to come off the left-hand headlamp 16 and rise in the washer liquid.

At the second step of the second cycle, the second injection nozzle 84 injects the washer liquid toward the left-hand headlamp 16 for the second preset time period t2, similarly as the second step of the first cycle. The washer liquid injection for the time period t2 serves to remove the dirt caused to rise by the washer liquid injected in the first cycle from the left-hand headlamp 16 so that the cleaning of the left-hand headlamp 16 completes.

As mentioned above, the right-hand and left-hand headlamps 12 and 16, which are arranged on the right and left sides of the vehicle, respectively, are effectively cleaned.

The electromagnetic valve 110 is operative to supply the washer liquid to the selected one of the first and second injection nozzles 82 and 84 according to the application and non-application (on/off) of current to the electromagnetic coil 128 based on the injection pattern (control method) preset in the controller 130. That is, the first and second injection nozzles 82 and 84 do not inject the washer liquid at the same time but inject only to the right-hand headlamp 12 at the first step and, then, only to the left-hand headlamp at the subsequent second step so that an amount per unit time of the washer liquid to be discharged from the pump apparatus 134 is limited, resulting in making the pump apparatus 134 compact.

According to the headlamp cleaner 80 of the second embodiment and the control method applied thereto, the headlamp cleaner 80 can be manufactured at lower cost and installed without difficulty in the engine room whose installation space is limited since the pump 134 is compact as mentioned above.

Further, the dirt of the headlamps 12 and 16 can be easily removed, so the headlamps 12 and 16 can be effectively cleaned, since the controller 130 instructs to execute the first and second cycles and the dirt on each of the headlamps 12 and 16 rises in the washer liquid due to the washer liquid injection based on the first cycle and, then, is blown off by the washer liquid injection based on the second cycle.

In particular, the injection time period t1 (the first and second preset time periods) of the first cycle for giving moisture to the respective headlamps 12 and 16 to cause the dirt to rise in the washer liquid is shorter than the injection time period t2 of the second cycle so that cleaning (injection) time is shorter and consumption of the washer liquid is smaller as a whole. As a result, not only cleaning efficiency is higher but also capacity of the tank 26 is smaller so that the headlamp cleaner 80 is more compact and more easily installed in the vehicle.

Furthermore, the pump apparatus 140 according to the second embodiment has as the injection valve change over means the electromagnetic valve 110 interposed between the pump 134 and the injection nozzles 82 and 84, that is, the pump 134 itself does not play a roll as the injection valve change over means, which is different from the first embodiment, the structure of the pump 134 is simpler (of a general purpose) and more compact. Accordingly, a washer device for injecting washer liquid to a front windshield glass of the vehicle may be commonly used as the pump 134 so that the headlamp cleaner 80 is manufactured at lower cost.

Moreover, even if a distance between the pump 134 and each of the injection nozzles 82 and 84 is relatively long, the washer liquid is normally reserved in the piping hose 132 between the pump 134 and the electromagnetic valve 110 so that, when the pump 134 is operated, the washer liquid can be promptly injected from the injection nozzles 82 and 84. In particular, in case of the expansion and contraction type first and second injection nozzles 82 and 84, the extensible nozzle 90 can expand immediately after the pump 134 is operated and inject the washer liquid toward the injection nozzles 82 and 84, since the washer liquid always remains at the upstream of the spherical valve 104 in the electromagnetic valve 110.

Still further, since the washer liquid is supplied selectively to the one of the first and second injection nozzles 82 and 84, it is not required that a pressure loss due to the piping hose 20 connecting the electromagnetic valve 110 and the first injection nozzle 82 and a pressure loss due to the piping hose 22 connecting the electromagnetic valve 110 and the second injection nozzle 84 are set identical, that is, it is not necessary to install the piping hoses in consideration of pressure balance therebetween as in the conventional headlamp cleaner. Therefore, the headlamp cleaner 80 can be easily mounted or assembled to the vehicle.

Figure 9:
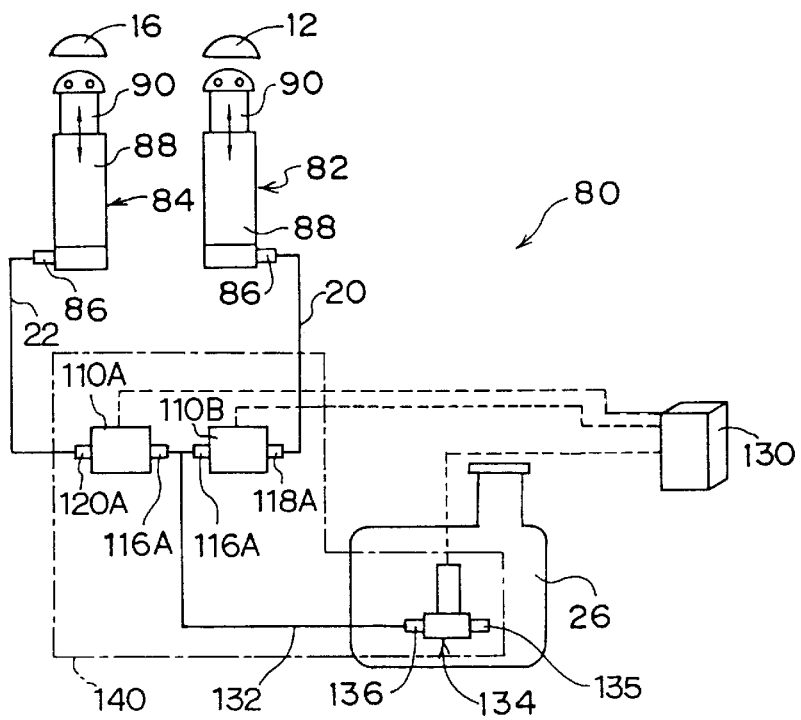
FIG. 9 is a perspective view showing an outline of a structure of a headlamp cleaner according to a modification of the second embodiment.

Instead of the electromagnetic valve 110 that switches from the communication between the flow-in conduit and one of flow-out conduits to the communication between the flow-in conduit and another one of flow-out conduits in the second embodiment, a pair of electromagnetic valves 110A and 110B (first and second electromagnetic valves) that are operative to open and close the individual discharge ports 118A and 120A, respectively, may be employed as shown in FIG. 9. In this case, if each of the electromagnetic valves 110A and 110B is arranged immediately before (in vicinity of and on an upstream side of) each of the first and second injection nozzles 82 and 84, each response time of the first and second injection nozzles 82 and 84 becomes more rapid since the washer liquid remains at the upstream of the each of the electromagnetic valves 110A and 110B.

In the second embodiment, instead of the structure that the operation of the pump 134 stops temporarily between the first and second steps and between the first and second cycles, the pump apparatus 134 may be continuously operated during the time period when the switch is turned on for actuating the headlamp cleaner 80.

In the first and second embodiments, the headlamp cleaner 10 may have the first and second injection nozzles 82 and 84 instead of the first and second injection nozzles 14 and 18 and, on the other hand, the headlamp cleaner 80 may have the first and second injection nozzles 14 and 18 instead of the first and second injection nozzles 82 and 84.

Further, in the first and second embodiments, in place that the controller 74 or 130 executes a unit cycle composed of the first and second steps two times, the controller 74 or 130 may execute the unit cycle only one time or more than three times. Furthermore, in place that the injection time period t1 for the first cycle is shorter than the injection time period t2 for the second cycle, the injection time period t1 may be equal to or longer than the injection time period t2.

Moreover, in the first and second embodiments, in place that when the injection time period t1 or t2 at the first step (the first preset time period) of the first or second cycle is equal to the injection time period t1 or t2 at the second step (the second preset time period) thereof, the injection time period at the first step may differ from the injection time period at the second step. Still further, it may be set as the injection pattern that the washer liquid is injected toward the left-hand headlamp 16 at the first step and, then, toward the right-hand headlamp 12 at the second step.

In particular, it is preferable that the first injection nozzle 14 or 82 injects the washer liquid to one of the headlamps 12 and 16 on a driver seat side and the second injection nozzle 18 or 84 injects the washer liquid to the other of the headlamps 12 and 16 on a passenger front seat side. In this case, the headlamp on the driver seat side is cleaned first with priority over the headlamp on the passenger front seat side so that an intensity of illumination of the headlamp on the driver seat side is recovered earlier than that of the headlamp on the passenger front seat side, which has an advantage that driver's visibility is secured at an earlier time.

Further, in a case that the headlamp on the driver seat side is cleaned first with priority over the headlamp on the passenger front seat side, it is preferable that an injection time period t1 or t2 at the first step (the first preset time period) of the first or second cycle is longer than an injection time period t1' or t2' at the second step (the second preset time period) thereof as shown in FIG. 10. This will serve to remove the dirt of from the headlamp on the driver seat side more intensively than that of from the headlamp on the passenger front seat in view of effectively securing the driver's visibility.

What is claimed is:

1. A headlamp cleaner for injecting washer liquid to headlamps of a vehicle provided respectively on a driver seat side and on a passenger front seat side, the headlamp cleaner comprising:

first and second injection nozzles, one of which is positioned near and injects the washer liquid to one of the headlamps and the other of which is positioned near and injects the washer liquid to the other of the headlamps;

a tank in which the washer liquid is stored;

a pump apparatus having an intake port communicating with the tank and first and second discharge ports communicating with the first and second injection nozzles, respectively, the pump apparatus being provided with a pump for delivering under pressure the washer liquid sucked from the tank through the intake port to the first and second discharge ports; and an injection control unit for generating signals to control the pump apparatus, wherein:

the pump apparatus is further provided with injection nozzle change over means operative based on the signals from the injection control unit to cause a first selective flow of the washer liquid from the pump only to one of the first and second injection nozzles through one of the first and second discharge ports and, then, switch the first selective flow to a second selective flow of the washer liquid from the pump only to the other of the first and second injection nozzles through the other of the first and second discharge ports, wherein the signals generated by the injection control unit govern the pump apparatus to execute, as an injection cycle, a first step of injecting the washer liquid only from the first injection nozzle for a first preset time period and, then, a second step of injecting the washer liquid only from the second injection nozzle for a second preset time period, wherein the signals generated by the injection control unit further govern the pump apparatus to execute the injection cycle at least twice, and wherein the signals generated by the injection control unit govern the pump apparatus to execute the injection cycle at least a twice, whereby each of the first and second preset time periods in the first injection cycle is shorter than that in the second injection cycle and subsequent injection cycles.

2. A headlamp cleaner according to claim 1, wherein the first injection nozzle is positioned near the headlamp on the driver seat side and the second injection nozzle is positioned near the headlamp on the passenger front seat side.

3. A headlamp cleaner according to claim 2, wherein the first preset time period is longer than the second preset time period.

4. A headlamp cleaner according to claim 1, wherein the injection nozzle change over means is an electromagnetic valve operative based on the signals from the injection control unit to cause a first state that the first discharge port is opened and the second discharge port is closed and, then, switch the first state to a second state that the first discharge port is closed and the second discharge port is opened.

5. A headlamp cleaner according to claim 1, wherein each of the first and second injection nozzles has an extensible nozzle moving to a position closer to each of the headlamps, when pressure of the washer liquid discharged from the pump is applied thereto, and to a position away from the each of the headlamps, when the pressure of the washer liquid discharged from the pump is not applied thereto.

6. A headlamp cleaner for injecting washer liquid to headlamps of a vehicle provided respectively on a driver seat side and on a passenger front seat side, the headlamp cleaner comprising:

first and second injection nozzles, one of which is positioned near and injects the washer liquid to one of the headlamps and the other of which is positioned near and injects the washer liquid to the other of the headlamps;

a tank in which the washer liquid is stored;

a pump apparatus having an intake port communicating with the tank and first and second discharge ports communicating with the first and second injection nozzles, respectively, the pump apparatus being provided with a pump for delivering under pressure the washer liquid sucked from the tank through the intake port to the first and second discharge ports; and an injection control unit for generating signals to control the pump apparatus, wherein:

the pump apparatus is further provided with injection nozzle change over means operative based on the signals from the injection control unit to cause a first selective flow of the washer liquid from the pump only to one of the first and second injection nozzles through one of the first and second discharge ports and, then, switch the first selective flow to a second selective flow of the washer liquid from the pump only to the other of the first and second injection nozzles through the other of the first and second discharge ports; and wherein the pump is driven based on the signals from the injection control unit to rotate in a normal direction and, then, switched to rotate in a reverse direction, and the pump apparatus has first and second valves and further has first and second intake conduits communicating with the intake port, whereby, when the pump is rotated in the normal direction, pressure of the washer liquid sucked through the second intake conduit and pressurized by the pump causes the first valve to move so as to close the first intake conduit and open the first discharge port in a state that the second valve closes the second discharge port, and, when the pump is rotated in the reverse direction, pressure of the washer liquid sucked through the first intake conduit and pressurized by the pump causes the second valve to move so as to close the second intake conduit and open the second discharge port in a state that the first valve closes the first discharge port, so that the first and second valves in cooperation with the pump constitute the injection nozzle change over means.

7. A headlamp cleaner according to claim 6, wherein the pump has an electric motor having an impeller fixed to a rotating axis thereof.

8. A headlamp cleaner for injecting washer liquid to headlamps of a vehicle provided respectively on a driver seat side and on a passenger front seat side, the headlamp cleaner comprising:

first and second injection nozzles, one of which is positioned near and injects the washer liquid to one of the headlamps and the other of which is positioned near and injects the washer liquid to the other of the headlamps;

a tank in which the washer liquid is stored;

a pump apparatus having an intake port communicating with the tank and first and second discharge ports communicating with the first and second injection nozzles, respectively, the pump apparatus being provided with a pump for delivering under pressure the washer liquid sucked from the tank through the intake port to the first and second discharge ports; and an injection control unit for generating signals to control the pump apparatus, wherein:

the pump apparatus is further provided with injection nozzle change over means operative based on the signals from the injection control unit to cause a first selective flow of the washer liquid from the pump only to one of the first and second injection nozzles through one of the first and second discharge ports and, then, switch the first selective flow to a second selective flow of the washer liquid from the pump only to the other of the first and second injection nozzles through the other of the first and second discharge ports; and wherein the injection nozzle change over means is first and second electromagnetic valves operative independently of each other based on the signals from the injection control unit to cause a first state that the first discharge port is opened by the first electromagnetic valve and the second discharge port is closed by the second magnetic valve and, then, switch the first state to a second state that the first discharge port is closed by the first magnetic valve and the second discharge port is opened by the second magnetic valve.

9. A headlamp cleaner according to claim 8, wherein the first and second electromagnetic valves are positioned in vicinity of and upstream of the first and second injection nozzles, respectively.

10. A method of controlling washer liquid injection from the first and second injection nozzle of the headlamp cleaner including a first and second injection nozzles one of which is positioned near and injects the washer liquid to one of the headlamps and the other of which is positioned near and injects the washer liquid to the other of the headlamps, a tank in which the washer liquid is stored, a pump apparatus having an intake port communicating with the tank and first and second discharge ports communicating with the first and second injection nozzles, respectively, the pump apparatus being provided with a pump for delivering under pressure the washer liquid sucked from the tank through the intake port to the first and second discharge ports, and an injection control unit for generating signals to control the pump apparatus, wherein the pump apparatus is further provided with injection nozzle change over means operative based on the signals from the injection control unit to cause a first selective flow of the washer liquid from the pump only to one of the first and second injection nozzles through one of the first and second discharge ports and, then, switch the first selective flow to a second selective flow of the washer liquid from the pump only to the other of the first and second injection nozzles through the other of the first and second discharge ports, the method comprising:

executing a first injection of the washer liquid only from the first injection nozzle for a first preset time period;

after finishing the first injection, executing a second injection of the washer liquid only from the second injection nozzle for a second preset time period, wherein the first and second injection constitutes an injection cycle; and executing the injection cycle at least a twice, wherein each of the first and second preset time periods in the second injection cycle and subsequent injection cycles is longer than that in the first injection cycle.

11. A method of controlling the washer liquid injection according to claim 10, wherein the washer liquid from the first injection nozzle is injected toward the headlamp on the driver seat side and that of the second injection nozzle is injected toward the headlamp on the passenger front seat side.

12. A method of controlling the washer liquid injecting according to claim 10, wherein the first preset time period is longer than the second preset time period.

13. A method of controlling washer liquid injection from a headlamp cleaner, the method comprising:

injecting washer liquid through first and second injection nozzles of the headlamp cleaner, one of the first and second injection nozzles is positioned near and injects the washer liquid to one of headlamps and another of the first and second injection nozzles is positioned near and injects the washer liquid to another of the headlamps;

delivering under pressure the washer liquid sucked from a tank in which the washer liquid is stored through an intake port of a pump apparatus by a pump of the pump apparatus, the intake port communicating with the tank as well as first and second discharge ports that communicate with the first and second injection nozzles;

controlling flow of the washer liquid via a change over means to provide a first selective flow of the washer liquid from the pump only to one of the first and second injection nozzles through one of the first and second discharge ports and, then, switching the first selective flow to a second selective flow of the washer liquid from the pump only to another of the first and second injection nozzles through another of the first and second discharge ports;

executing a first injection of the washer liquid only from the first injection nozzle for a first preset time period;

after finishing the first injection, executing a second injection of the washer liquid only from the second injection nozzle for a second preset time period, wherein the first and second injection constitutes an injection cycle; and executing the injection cycle at least twice, wherein the executing of the injection cycle at least twice further comprises executing a second injection cycle for a longer time period than a time period of executing a first injection cycle.

14. A method of controlling washer liquid injection from a headlamp cleaner according to claim 13, wherein the executing of a first injection of the washer liquid only from the first injection nozzle for a first preset time period and the executing of a second injection of the washer liquid only from the second injection nozzle for a second preset time period further comprises executing the first injection for the first preset time period that is greater than the second time period.

* * * * *